United States Patent
Hoglund et al.

(10) Patent No.: US 9,400,614 B2
(45) Date of Patent: Jul. 26, 2016

(54) METHOD AND SYSTEM FOR PROGRAMMABLE SEQUENCER FOR PROCESSING I/O FOR VARIOUS PCIE DISK DRIVES

(71) Applicant: LSI CORPORATION, San Jose, CA (US)

(72) Inventors: Timothy E. Hoglund, Colorado Springs, CO (US); Gary J. Piccirillo, Houston, TX (US); James K. Yu, Houston, TX (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 130 days.

(21) Appl. No.: 14/138,641

(22) Filed: Dec. 23, 2013

(65) Prior Publication Data

US 2015/0160886 A1 Jun. 11, 2015

Related U.S. Application Data

(60) Provisional application No. 61/912,437, filed on Dec. 5, 2013.

(51) Int. Cl.
*G06F 3/00* (2006.01)
*G06F 3/06* (2006.01)
*G06F 13/38* (2006.01)

(52) U.S. Cl.
CPC .............. *G06F 3/0656* (2013.01); *G06F 3/061* (2013.01); *G06F 3/0653* (2013.01); *G06F 3/0659* (2013.01); *G06F 3/0661* (2013.01); *G06F 3/0689* (2013.01); *G06F 13/387* (2013.01); *G06F 2003/0691* (2013.01); *G06F 2003/0692* (2013.01)

(58) Field of Classification Search
CPC ... G06F 3/0656; G06F 3/0653; G06F 3/0661; G06F 3/061; G06F 13/387; G06F 3/0659
USPC .................................................. 710/5
See application file for complete search history.

(56) References Cited

U.S. PATENT DOCUMENTS

| 2012/0102263 | A1* | 4/2012 | Aswadhati | G06F 13/16 711/103 |
| 2012/0110259 | A1* | 5/2012 | Mills | G06F 13/00 711/113 |

* cited by examiner

*Primary Examiner* — Ernest Unelus

(57) ABSTRACT

Disclosed is a system and method for using a programmable sequencer to produce a required command for a particular standard, or format, being used by the PCIe disk drive. A PCIe disk drive may support a different standard, or format. A mix of any number of different standards, or formats, is permitted in the system and method. For each message, a different set of instructions can be selected for the conversion process.

17 Claims, 1 Drawing Sheet

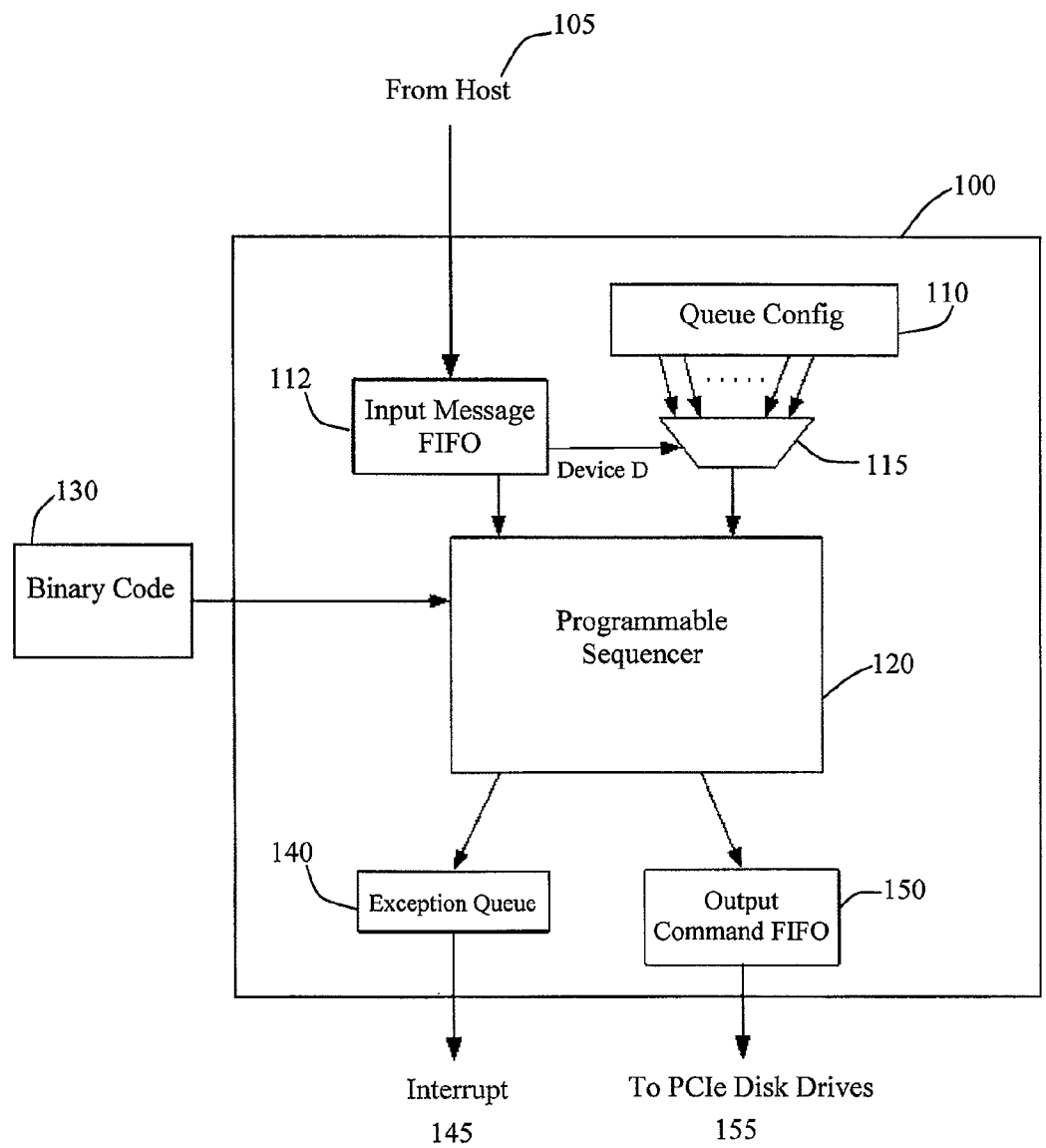

METHOD AND SYSTEM FOR PROGRAMMABLE SEQUENCER FOR PROCESSING I/O FOR VARIOUS PCIE DISK DRIVES

FIELD OF THE INVENTION

The field of the invention relates generally to disk drive message processing for PCIe disk drive devices.

BACKGROUND OF THE INVENTION

PCIe (Peripheral Component Interconnect Express) is a high-speed serial computer expansion bus standard. PCI Express operates in consumer, server, and industrial applications. The PCIe bus is like a high-speed serial replacement of the older PCI/PCI-X bus, an interconnect bus using shared address/data lines. PCI uses a shared parallel bus architecture, where the PCI host and all devices share a common set of address/data/control lines. In terms of bus protocol, PCIe communication is encapsulated in packets. The work of packetizing and de-packetizing data and status-message traffic is handled by the transaction layer of the PCIe port.

NVMe (Non-Volatile Memory Express) is a specification for accessing solid-state drives (SSDs) on a PCIe bus. NVM Express is an optimized, high performance, scalable host controller interface with a streamlined register interface and command set designed for enterprise and client systems that use PCI Express SSDs.

AHCI (Advanced Host Controller Interface) is a technical standard that specifies the operation of Serial ATA (SATA) host bus adapters in a non-implementation-specific manner. AHCI benefits from legacy software compatibility, it does not deliver optimal performance when talking to a PCI Express SSD. AHCI was developed at a time when the purpose of the Host Bus Adapter (HBA) in a system was to connect the CPU/memory subsystem with the much slower storage subsystem based on rotating magnetic media. Such an interface has some inherent inefficiency when applied to SSD devices, which behave much more like DRAM than spinning media. At a high level, the basic advantages of NVMe over AHCI relate to the ability to exploit parallelism in host hardware and software.

SOP (SCSI (Small Computer System Interface) over PCIe) attempts to standardize the SCSI protocol across a PCIe physical interface. SOP supports PQI (PCIe Queuing Interface). SOP allows for re-use of existing storage industry testing technologies for testing PCIe SSDs.

SUMMARY OF THE INVENTION

An embodiment of the invention may therefore comprise a method of converting a message, the message comprising a Device ID, from one of a host and firmware, the method comprising retrieving, by a programmable device, code from a storage device, monitoring an input buffer for a message from the host, if said input buffer contains a message from the host, retrieving, by the programmable device, information from a configuration queue by using the Device ID, and converting the message into one of at least two formats by using the information for one of a plurality of Peripheral Component Interconnect Express (PCIe) disk drives with the programmable device using the information from the configuration queue.

An embodiment of the invention may further comprise a system for converting a message to a format appropriate for a Peripheral Component Interconnect Express (PCIe) disk drive, the system comprising a programmable device, and one or more configuration queues, wherein the programmable device is enabled to retrieve code from an external storage, information from the configuration queue and to convert, based at least on a Device Type information received from the configuration queue, a message from a host intended for one of at least two formats for of a plurality of PCIe devices connected to the system, and wherein each of the one or more configuration queues is enabled to receive a Device ID from the host message, which allows indexing of the configuration queue and provide information to the programmable device based on the Device ID.

BRIEF DESCRIPTION OF THE DRAWINGS

FIG. 1 shows a system for processing a message for a PCIe disk drive by a programmable sequencer.

DETAILED DESCRIPTION OF THE EMBODIMENTS

Hardware devices are increasingly becoming capable of direct connection to a PCIe bus. A variety of standards, including but not limited to SOP, NVMe and ACHI, have been created to handle communication issues with these hardware devices. The format of commands sent to a PCIe disk drive is different for each standard. Accordingly, the number of permutations for a conversion required for all of standards and commands is extremely large. It is understood that the terms "hard drive", "hard disk" and "hard disk drive" are not intended to be limited to a hard disk drive (HDD). As such, it is understood that these terms, as well as the term "disk drive" are intended to include HDD as well as solid-state disk drives (SSD). Also, as used herein in this description, the term "standard" is intended to be inclusive of formats and utilizations that are associated with certain technologies and methodologies, but which may not be a "standard" as that term is generally accepted, which is a norm or requirement in regard to a technical system. While the term "standard" includes the generally accepted meaning, it is not used herein to exclude other formats that may not meet the standard of a "standard."

Commands sent to PCIe disk drives may require a different format than SAS/SATA drives. Messages received from a Host are in a particular format and may need to be converted to a format required by the standard being utilized. As noted above, there is an extensive amount of permutations for converting from an initial message format into a desired format for each standard. As is understood, for the conversions needed, firmware may be notified when a message is received and then firmware will perform the required command formatting. Naturally, firmware will have lower performance than hardware. Also, the standard to be used the most may be selected and the hardware will do the message conversion for that standard. The firmware will do the conversions for the remaining standards. Further, it is understood that changes in a standard may require modifications to the hardware to accommodate those changes.

An embodiment of the invention provides support for each of the standards and utilizes a programmable sequencer that is guided by a configuration structure and information in a host message. The programmable sequencer produces a required command for the standard being used by the PCIe disk drive. For each message, a different set of instructions can be selected for the conversion process. The configuration structure may contain a unique setting for each disk drive with which it communicates. This allows the individual PCIe disk drive to use any of the standards in addition to being able to support any mix of devices.

Embodiments of the invention allow hardware to perform all of the message conversion necessary for each of the PCIe disk drive standards. In addition, flexibility is provided to accommodate changes to the standards without requiring modifications to the hardware.

As discussed, a programmable sequencer is used to perform all of the functions necessary to convert the initial message into a format required by a standard. At system boot up, the sequencer will read in binary code from external storage. This external storage may be such as system memory or flash memory. Those skilled in the art will understand the various types of external storage available from which a sequencer may read. This read by the sequencer will provide instructions for the steps necessary to convert the different messages. The binary code will contain checks to perform on the message to validate it is in the correct format for conversion. If there is a change to one of the standards that may require the command to be in a different format, the binary code can be modified to indicate a different set of instructions. The different set of instructions can be loaded into the external storage device.

Also, embodiments of the invention may contain a separate configuration structure called a Queue Config, or other name that suits a developer or user. There is a Queue Config for each device that requires communication. On a per device basis, the Queue Config will indicate the standard being used, the Host Message format, block size, or other information related to a message. This information is sent to the programmable sequencer which selects which instructions need to be executed for performing the message conversion.

Accordingly, embodiments of this invention provide a means of communicating with various types of PCIe disk drives. They also allow any mix of PCI e disk drives supporting the different standards. They perform validation checks so that an invalid message is not sent to the disk drive. And they are flexible to accommodate any changes to the standards that might occur.

Further to the invention, at system boot up, the programmable sequencer will retrieve binary code from external storage at an address that is setup in the sequencer's configuration registers. This binary code will contain the instructions for all of the different steps required to convert the host message to the format required by any of the standards. In addition, it will contain a set of validation checks to perform on the message that is received. Once a host message has been retrieved and placed into the sequencer's input FIFO, this will indicate to the programmable sequencer to begin the conversion process. Information from the Queue Config is accessed and the appropriate instructions are selected to execute. The programmable sequencer modifies the message and places it into an appropriate command format of the intended device. Accordingly, the message is formatted as required for an AHCI, NVMe, SOP, or other standard, device. As noted, there is a separate Queue Config structure for each individual device. The Queue Config structure is indexed by Device ID information that is in the message. It is understood that a FIFO is a First In, First Out method for organizing and manipulating a data buffer, or data stack, where the oldest entry, or "bottom", of the stack is processed first. Those skilled in the art will understand how to use embodiments of the invention to utilize various types of buffers and queues in order to accomplish the aims of the invention. Accordingly, the term buffer is intended to include those buffers, FIFOs, stacks and queues suitable to use in methods and systems of the invention.

In addition to message conversion, the programmable sequencer performs a variety of validation checks on the host message. For instance, information from Queue Config is used to select required validation checks. If the validation check fails, an exception is generated and firmware is notified that it needs to handle the message. If the validation checks are successful, the formatted command is placed into an output FIFO as long as there is space available. The command is then available to be sent to the PCIe disk drive.

Utilization of a programmable sequencer allows for flexibility to adapt to changes in the standards. Those skilled in the art will understand the fact that standards are indeed updated and changed to account for a variety of issues. Changes to the hardware are unnecessary. Combined with a Queue Config structure per device, this allows for a mixture of PCIe disk drives that conform to a variety of PCIe device types to be used simultaneously. Further, all message conversion is done in hardware.

FIG. 1 shows a system for processing a message for a PCIe disk drive by a programmable sequencer. A message intended for the PCIe disk drive is processed by the programmable sequencer. The system 100 comprises a configuration queue, Config Queue, 110 setup to monitor a FIFO 112. The Queue Config 110 and the Input Message FIFO connect to a multiplexer 115. The multiplexer (mux) 115 selects one of several input signals and forwards the selected input into a single line. The FIFO receives inputs from a host 105. The output of the mux 115 is sent to a programmable sequencer 120 which also receives input from a memory 130. It is understood that the memory 130 may contain binary code as described in this description. The programmable sequencer outputs to an Exception Queue 140 and an Output Command FIFO 150 depending on the results of computations in the programmable sequencer 120. The Exception Queue 140 outputs an interrupt 145 and the Output Command FIFO outputs to PCIe disk drives 155.

Continuing with FIG. 1, the diagram shows how a message intended for a PCIe disk drive 155 is processed by the programmable sequencer 120. At system boot up, firmware will setup the programmable sequencer's 120 registers. One of those registers is the address where instructions (binary code) for the sequencer 120 are located in external storage 130. After configuration, the sequencer 120 is notified to fetch the instructions and store it internally. It also contains various validation checks that will need to be performed on the message to guarantee it can be processed properly by the sequencer 120. As discussed, if the standards are changed a different command format may be required. Different validation check may also be discovered to be needed. The binary code containing the instructions can be altered and re-loaded into the external storage 130. The system 100 can then be re-booted and the new code can be retrieved by the sequencer 120. This allows for flexibility as opposed to having a fixed set of conversion steps and validation checks in hardware that cannot be easily changed. In the embodiments of the invention, no modifications to the hardware are required.

After the code has been retrieved from the external storage 130, the processing of messages can begin. The sequencer 120 monitors an input FIFO 112. When the Input FIFO 112 is not empty, this indicates a host 105 message has been retrieved and is ready to be converted. The message from the Host 105 contains a device ID that is used to index the Queue Config 110 structure in order to retrieve information required for message processing. Queue Config 110 is a set of configuration registers that allows a different setup for each device. There is an individual Queue Config 110 structure for each device. In an embodiment of the invention there may be 32 devices that are supported. Device Type field/information in the Queue Config 110 structure is used to indicated if the message is intended for an AHCI, NVMe or SOP device. The Device Type, along with other information in Queue Config 110 is used to select the validation checks to perform on the message. This maintains that message conversion is done properly. If any of the validation checks fail, the ID for the message is placed into the Exception Queue 140. An interrupt 145 is accordingly generated to firmware. This interrupt 145 indicates that there is a need to handle the message indexed by the entry in the Exception—that a condition was detected where the sequencer 120 was unable to format the command properly for the intended device. If all of the validation checks pass, the sequencer will begin the conversion of the message into the format required by the device it is being sent to. The Device Type and other information from Queue Config 110 is used to select the appropriate instructions needed for the conversion process. This information may include Host Message format, block size, device mode, and other information and is retrieved from Queue Config 110 to be used by the sequencer 120. After the command is properly formatted, the formatted command is placed in the Output FIFO 150 where is can be retrieved and sent to the appropriate device 155.

Using information contained within the message along with configuration settings, the sequencer 120 is able to be informed where various fields are located in the message. This allows each input message to the sequencer 120 to be formatted differently. In addition, the configuration structure can be used to indicate how the output message/command that is produced should be formatted. Each output message 155 can be formatted differently. This allows for any of the standards to be used by the PCIe disk drives being communicated with. Each disk drive can use a different standard and any combination can be accommodated by the configuration structure.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising:
    receiving, at an input buffer, a message from a host intended for a Peripheral Component Interconnect Express (PCIe) disk drive, the message including a Device ID;
    indexing, with a programmable device, one of a plurality of configuration queues using the Device ID in the message in the input buffer, the plurality of configuration queues comprising hardware structures that correspond to different PCIe disk drives which are separate from the PCIe disk drives;
    storing a binary code at an address in external memory that is memory other than the different PCIe disk drives;
    reading, with the programmable device in response to a system boot, the binary code from the address based on a register configuration of the one of the plurality of configuration queues;
    selecting conversion information based on the binary code;
    modifying the message based on the conversion information to convert the message into one of at least two formats in compliance with the intended PCIe disk drive; and
    sending the converted message to the intended PCIe disk drive.

2. The method of claim 1, wherein there is a separate configuration queue for the different PCIe disk drives.

3. The method of claim 1, wherein the one of the plurality of configuration queues comprises a plurality of configuration registers which enable a different setup for each of said plurality of PCIe disk drives.

4. The method of claim 1, wherein said one of at least two formats comprise Non-Volatile Memory Express (NVMe), Advanced Host Controller Interface (ACHI) and Small Computer System Interface (SCSI) over PCIe (SOP).

5. The method of claim 1, wherein the conversion information comprises a one or more fields and wherein one of said one or more fields comprises Device Type information indicating what type of format said message is intended for.

6. The method of claim 5, said method further comprising performing a validation check of said message based at least on said Device Type information.

7. The method of claim 6, said method further comprising, if said validation check fails, notifying firmware of said failed validation check wherein said process of converting said message is performed by said firmware.

8. The method of claim 5, wherein at least said Device Type information from the one of the plurality of configuration queues is used to select appropriate instructions required for said conversion process.

9. A system for converting a message to a format appropriate for a Peripheral Component Interconnect Express (PCIe) disk drive, said system comprising:
    a programmable device; and
    a plurality of configuration queues comprising hardware structures corresponding to a plurality of PCIe disk drives that are separate from the PCIe disk drives, wherein each of said plurality of configuration queues comprises a plurality of configuration registers which enable a different setup for each of said plurality of PCIe disk drives;
    wherein said programmable device is configured to retrieve code from an external storage that is storage other than the different PCIe disk drives, to access a configuration queue to retrieve Device Type information based on the code, and to convert a message from a host intended for one of at least two formats for of the plurality of PCIe devices connected to said system; and
    wherein each of said one or more configuration queues is enabled to receive a Device ID from said host message, which allows indexing of said configuration queue and to provide information to said programmable device based on said Device ID.

10. The system of claim 9, wherein there is a separate configuration queue of said plurality of configuration queues or each of said plurality of PCIe disk drives.

11. The system of claim 9, wherein said code is binary code.

12. The system of claim 9, wherein said one of at least two formats comprise Non-Volatile Memory Express (NVMe), Advanced Host Controller Interface (ACHI) and Small Computer System Interface (SCSI) over PCIe (SOP).

13. The system of claim 9, wherein said configuration queue provided information comprises one or more fields and wherein one of said one or more fields comprises Device Type information indicating what type of format said message is intended for.

14. The system of claim 13, wherein said programmable device is further enabled to perform a validation check of said message based at least on said Device Type information.

15. The system of claim 14, wherein if said validation check is failed, said programmable device is enabled to notify firmware, via an interrupt, of said failed validation check and continue with a next message.

16. The system of claim 13, wherein said configuration device provided information is used to select appropriate instructions required for said conversion by said programmable device.

17. A method comprising:
   receiving, at an input buffer, a message from a host intended for a Peripheral Component Interconnect Express (PCIe) disk drive, the message including a Device ID;
   indexing, with a programmable device, one of a plurality of configuration queues using the Device ID in the message in the input buffer, the plurality of configuration queues comprising hardware structures that correspond to different PCIe disk drives which are separate from the PCIe disk drives, wherein the one of the plurality of configuration queues comprises a plurality of configuration registers which enable a different setup for each of said plurality of PCIe disk drives;
   retrieving conversion information from the one of the plurality of configuration queues;
   modifying the message based on the conversion information to convert the message into one of at least two formats in compliance with the intended PCIe disk drive; and
   sending the converted message to the intended PCIe disk drive.

\* \* \* \* \*